(12) United States Patent
Coates

(10) Patent No.: US 6,608,170 B1
(45) Date of Patent: Aug. 19, 2003

(54) SYNDIOTACTIC POLY(LACTIC ACID)

(75) Inventor: Geoffrey W. Coates, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/490,449

(22) Filed: Jan. 24, 2000

Related U.S. Application Data

(60) Provisional application No. 60/127,003, filed on Mar. 31, 1999.

(51) Int. Cl.[7] ............................................... C08G 63/82

(52) U.S. Cl. ..................... 528/355; 528/297; 528/354; 528/357; 528/361; 525/437; 526/317.1

(58) Field of Search ................................ 528/297, 354, 528/357, 361, 355; 525/437, 450

(56) References Cited

U.S. PATENT DOCUMENTS

| | | | | |
|---|---|---|---|---|
| 4,279,249 A | * | 7/1981 | Vert et al. .................... | 525/415 |
| 4,983,745 A | * | 1/1991 | Muller et al. ................ | 424/426 |
| 5,128,144 A | * | 7/1992 | Korsatko-Wabnegg et al. .......................... | 424/422 |
| 5,214,159 A | | 5/1993 | Muller et al. ................ | 549/274 |
| 5,290,494 A | * | 3/1994 | Coombes et al. ........... | 264/216 |
| 5,310,865 A | * | 5/1994 | Enomoto et al. ............ | 526/361 |
| 5,317,064 A | * | 5/1994 | Spinu .......................... | 525/411 |
| 5,391,700 A | * | 2/1995 | Itoh et al. .................... | 528/297 |
| 5,430,125 A | * | 7/1995 | Hori et al. ................... | 528/354 |
| 5,440,007 A | * | 8/1995 | Gross et al. ................. | 525/408 |
| 5,516,657 A | * | 5/1996 | Murphy et al. .............. | 525/437 |
| 5,883,199 A | * | 3/1999 | McCarthy et al. ........... | 525/437 |
| 5,885,829 A | * | 3/1999 | Mooney et al. .............. | 435/325 |
| 5,916,584 A | * | 6/1999 | O'Donoghue et al. ....... | 424/426 |
| 6,143,863 A | * | 11/2000 | Gruber et al. ............... | 528/354 |

FOREIGN PATENT DOCUMENTS

JP     07216646    * 8/1995

OTHER PUBLICATIONS

H. Kricheldorf, M. Berl and N. Scharnagl ("Polymerization Mechanism of Metal Alkoxide Initiated Polymerizations of Lactide and Various Lactones", 1988, Makromol., v. 21, pp. 286–293.*
Haubenstock et al " Stereoselective polymerization of propylene oxide with a chiral aluminum oxide initiator", Macromol. Chem. (1987), 188 (12), 2789–99 Abstract.*
Bernardo, K. D. S., et al., New J. Chem. 19, 129–131 (1995).
Chemical Abstracts 110:213592W (1989).
Dialog Abstract of DE 3820299 (1989).
Ovitt. T. M., et al., J. Am. Chem. Soc. 121, No. 16, 4072–4073 (Apr. 7, 1999).

* cited by examiner

Primary Examiner—Tatyana Zalukaeva

(57) ABSTRACT

Syndiotactic poly(lactic acid) is formed by polymerization involving a cleavage of the same oxygen-acyl bond in a series of meso-lactide molecules to form polymer containing a series of units with stereocenters wherein adjacent stereocenters are of the opposite stereochemistry. The mechanism is catalyzed by chiral metal alkoxides that afford stereocontrol such as those formed by reacting

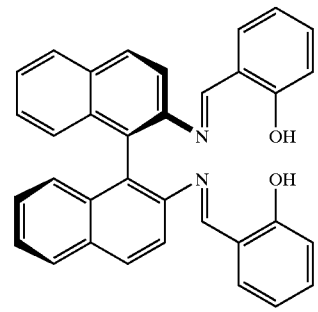

or the opposite enantiomer with Al(OR)$_3$ where R is straight chain or branched alkyl containing 1 to 20 carbon atoms, e.g., methyl or isopropyl, in solvent, with subsequent evaporation of solvent in vacuo.

9 Claims, No Drawings

SYNDIOTACTIC POLY(LACTIC ACID)

CROSS-REFERENCE TO RELATED APPLICATION

This application claims the benefit of U.S. Provisional Application No. 60/127,003, filed Mar. 31, 1999.

The invention was made at least in part with United States Government support under National Science Foundation grant CHE-9729214. The United States Government has certain rights in the invention.

TECHNICAL FIELD

The invention is directed to a stereospecific poly(lactic acid), to a method of making syndiotactic polymers, for example, syndiotactic poly(lactic acid), and to a catalyst useful in the method.

BACKGROUND OF THE INVENTION

Lactic acid polymers are biodegradable and have potential medical, agricultural and packaging applications.

Atactic poly(lactic acid) has been prepared by polymerization of lactide racemate. It has an amorphous structure.

Isotactic poly(lactic acid) has been prepared by polymerization of (R,R)-lactide or (S,S)-lactide and is crystalline.

Notably absent from the range of available microstructures is syndiotactic poly(lactic acid).

SUMMARY OF THE INVENTION

It is an object of the invention to provide syndiotactic poly(lactic acid).

Therefore, one embodiment of the invention is directed to syndiotactic poly(lactic acid).

Another embodiment of the invention is directed to a method of preparing syndiotactic polymer by selectively opening a cyclic monomer that contains two stereocenters, e.g., of opposite stereochemistry or of the same stereochemistry, and the use of this method to produce syndiotactic poly(lactic acid). For the production of syndiotactic poly(lactic acid), the method involves polymerizing cyclic dimer of lactic acid, e.g., meso-lactide, and comprises subjecting the same oxygen acyl bond in a series of meso-lactide molecules to cleavage to form polymer containing a series of units containing stereocenters, i.e., a sequence of units containing stereocenters, wherein adjacent stereocenters are of the opposite stereochemistry. The cleavages provide lactide ring opening and a series of linear groups for attachment to one another by joining of carbonyl moiety of one to oxygen moiety of the succeeding group. The cleavages are catalyzed by chiral complexes, which function to exhibit kinetic preference for reaction at one oxygen acyl bond site per molecule to the extent of fostering formation and joining of a series of the same units with respect to relative location of enantiomorphoric site and carbonyl and oxygen moieties. The chiral complex can be a chiral metal alkoxide. In one embodiment, the metal of the metal alkoxide is aluminum, and in one embodiment the metal of the metal alkoxide is not yttriumn. A suitable catalyst is prepared by reacting chiral ligand, e.g.,

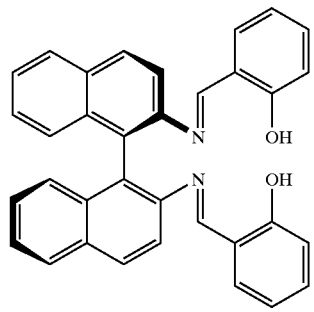

or the opposite enantiomer and aluminum alkoxide in solvent and then evaporating the solvent and alcohol byproduct.

A novel catalyst is prepared by reacting the chiral ligand (−)-2 with Al(OR)$_3$ where R is isopropyl, in toluene solvent, and then evaporating the toluene solvent in vacuo.

DETAILED DESCRIPTION

We turn firstly to the syndiotactic poly(lactic acid) herein. In one embodiment it contains from 20 to 5,000 units and comprises the structure

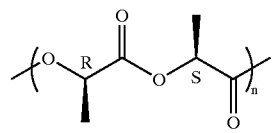

where n ranges from 20 to 5,000 and contains enantiotopic selectivity greater than 50%, preferably greater than 85%.

In one example herein, the syndiotactic poly(lactic acid) is prepared having the structural formula

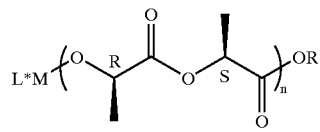

where L* is a chiral ligand, M is aluminum and R is H or straight chain or branched alkyl containing 1 to 20 carbon atoms and n ranges from 20 to 5,000; upon work-up L*M is replaced with H.

The syndiotactic poly(lactic acid) prepared in Example I hereafter has a M$_n$ of 12,030 and a molecular weight distribution of 1.05 and an enantiotopic selectivity of 96%.

We turn now to the method herein for preparing syndiotactic poly(lactic acid). In the method, an a chiral monomer is converted to an a chiral polymer using a chiral catalyst and involves the stereoselective ring-opening polymerization of meso-lactide.

Meso-lactide is a cyclic dimer of lactic acid and has the formula

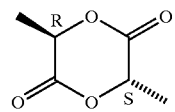

It contains two enantiotopic O-acyl bonds denoted A and B in the structure below.

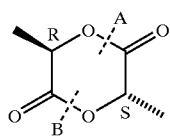

It can be synthesized in greater than 99% purity as described in Ger. Offen. DE 3,820,299 (1988) abstracted in Chem. Abstr. 110, 213592w (1989).

The ring-opening polymerization of the meso-lactide can be carried out at a temperature ranging from 0 to 120° C., preferably from 65 to 80° C., using a reaction time ranging from 1 to 80 hours, preferably from 10 to 40 hours in a non-protic solvent, e.g., toluene, using a chiral alkoxide catalyst functional for stereoselective ring-opening of the meso-lactide as an initiator. The molar ratio of catalyst to meso-lactide preferably ranges from 1:20 to 1: 5,000, very preferably from 1:50 to 1:200.

A reaction scheme for the reaction is set forth below where n ranges from 20 to 5,000, L* is a chiral ligand, M is a metal, preferably aluminum, R is H or straight chain or branched alkyl containing 1 to 20 carbon atoms, L*M —OR is a chiral initiator, $k_A$ is the rate constant for cleavage of bond A and $k_B$ is the rate constant for cleavage of bond B, and $k_A>>k_B$ means that the rate constant for cleavage of bond A is much greater than the rate constant for cleavage of bond B.

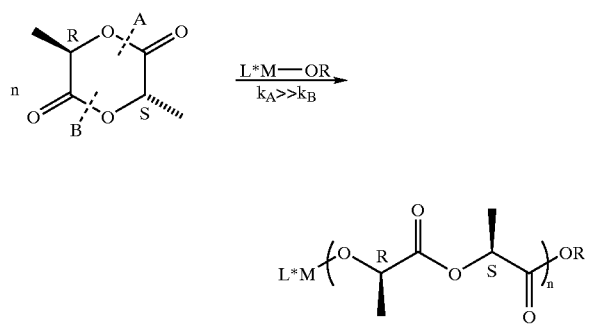

The chiral initiator selects between the enantiotopic acyl-oxygen bonds and provides enantiomorphic site control by exhibiting a kinetic preference for reaction at one of the two enantiomorphic sites. L*M is typically replaced by H by reaction with alcohol. For the same reaction scheme except that $k_B>>k_A$, the same syndiotactic polymer is formed.

The catalyst is preferably a chiral metal alkoxide prepared by reacting a chiral ligand with $Al(OR)_3$ in solvent and then evaporating the solvent. The R in $Al(OR)_3$ is straight chain or branched alkyl containing 1 to 20 carbon atoms and is, for example, methyl or isopropyl. The chiral ligand is preferably

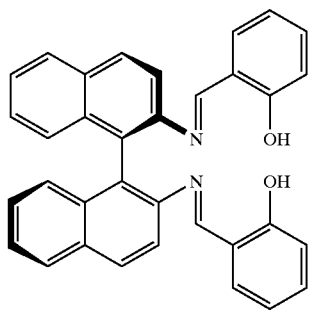

(-)-2 or the opposite enantiomer. The chiral ligand (-)-2 can be obtained as described in Bernardo, K. B., et al, New J. Chem. 19, 129–131 (1995). The reaction of (-)-2 with $Al(OR)_3$ where R is isopropyl is readily carried out without significant formation of catalytically-inactive bimetallic byproduct, for example, by reacting in non-protic solvent, e.g., toluene, at 50 to 100° C., for 12 to 60 hours using a 1:1 molar ratio of freshly distilled $Al(OR)_3$ to (-)-2, and then evaporating the solvent in vacuo. The structure of the chiral metal alkoxide is as yet uncharacterized.

As indicated above, this application claims the benefit of U.S. Provisional Application No. 60/127,003. The entire disclosure of U.S. Provisional Application No. 60/127,003 is incorporated herein by reference.

The invention is illustrated in the following working examples.

EXAMPLE I

Preparation of Catalyst

The ligand (-)-2 was synthesized according to the preparation described in Bernardo, K. D. et al, New J. Chem. 19, 129–131 (1995).

$6.7 \times 10^{-4}$ moles (0.33 gms) of (-)-2 and $6.7 \times 10^{-4}$ moles (0.14 gms) of freshly distilled $M(OR)_3$ where M is Al and R is isopropyl and toluene (10 mL) were loaded into a dry Schlenk tube in a glovebox. The molar ratio of (-)-2 to M (OR)$_3$ was 1:1. The mixture was heated to 70° C. and stirred for two days. The solvent was removed in vacuo, yielding a yellow solid aluminum containing catalyst. $^1$H NMR (Tol-$d_g$, 300 MHz)δ 7.92 (1H, s), 7.76 (2H, d, J-4.3 MHz), 7.68 (2H, t), 7.43 (4H, d, J=8.6), 7.31 (4H, t), 7.18 (2H, t), 6.90–7.14 (18H, m), 6.53 (1H, d, J-8.6), 6.42 (1H, d, J=7.5), 6.28–6.36 (2H, m), 6.23 (H, t), 4.08 (1H, m), 1.34 (3H, d, J=6.4), 0.71 (3H, d, J=5.9). Anal. calc. for $C_{37}H_{29}AlN_2O_3$: C, 77.07; H, 5.07; N, 4.86. Found: C, 76.37; H, 5.34; N, 4.50.

In another case, reaction of (-)-2 and $M(OR_3)$ was carried out where M is yttrium and R is $(CH_2)_2NMe_2$ where Me is methyl. Reaction conditions were as follows: In a glovebox, a dry Schlenk tube was loaded with yttrium tris (dimethylaminoethanol) (0.293 g, 0.829 mmol), (-)-2 (0.412 g, 0.836 mmol), and toluene (50 mL). The mixture was heated to 70° C. and stirred for one day. The solvent was removed in vacuo, yielding a yellow solid. The product was recrystallized by dissolving a minimum amount of methylene chloride, then layering with hexanes, and allowing to sit for 24 hours. Cannulation of solvent and drying of the residual crystals in vacuo yielded yttrium containing complex (0.365 g, 66% yield). $^1$H NMR (Tol-d$_g$, 300 MHz)δ 8.15 (1H,s), 7.67 (2H, m), 7.54 (1H, d, J=7.5), 7.2–7.4 (5H), 6.7–7.1 (13H), 3.27 (2H, m), 2.97 (2H, m), 2.55 (6H, br s), 1.59 (2H, m), 1.02 (2H, m).

EXAMPLE II

Synthesis of Syndiotactic Poly(lactic acid)

Meso-lactide obtained according to the procedure of Entenmann, G., et al, Ger. Offen DE 3,820,299 (1988) was dissolved in toluene to provide a concentration of 0.2M and aluminum containing catalyst prepared as described in Example I was added to provide a concentration of catalyst in the toluene of 0.002M. Reaction was carried out at 70° C. for 40 hours. The toluene was removed in vacuo and product was recovered by redissolving in methylene chloride and precipitating from cold methanol. A 94% conversion was obtained. Gel-permeation chromatography (tetrahydrofuran, versus polystyrene standards) revealed a M$_n$ of 12,030 (theoretical M$_n$=13,540) and a molecular weight distribution of 1.05. The narrow polydispersity and the linear correlation between M$_n$ and percent conversion are indicative of a living polymerization, as well as a single type of reaction site. Homonuclear decoupled H spectrometry where peaks were assigned to appropriate tetrads with the shifts reported by Thakur, K. A. M. et al., Chem. Commun. 1998, 1913–1914, showed a large rrr tetrad peak which is evidence of a highly syndiotactic polymer. An enantiotopic selectivity of 96% is calculated from the intensities of the rrr and rmr peaks. Further evidence of a high level of syndiotacticity are the solitary shifts in the $^{13}$C NMR at δ 169.2, 69.3 and 16.3 ppm (CDCl$_3$, 75 Mhz). The polymer is crystalline. Following annealing at 95° C. for 60 minutes, the polymer formed at 50° C. exhibits a T$_g$ at 34.1° C. and a T$_m$ at 152° C.

Results of syndiotactic poly(lactic acid) are also obtained where the catalyst differs from that used in that the R in the Al(OR)$_3$ reacted with (–)-2 is methyl instead of isopropyl.

Where polymerization is carried out with yttrium containing complex prepared as described in Example I, atactic poly(lactic acid) was obtained, not syndiotactic poly(lactic acid).

Variations

Variations will be obvious to those skilled in the art. Therefore, the scope of the invention is defined by the claims.

What is claimed is:

1. Syndiotactic poly(lactic acid) comprising the structure:

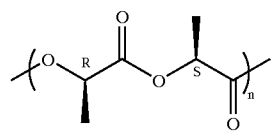

where n ranges from 20 to 5,000 and containing enantiotopic selectivity greater than 60%.

2. A process for preparing syndiotactic poly(lactic acid) comprising the structure:

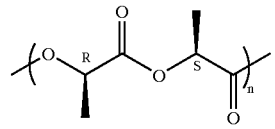

where n ranges from 20 to 5,000 and containing enantiotopic selectivity greater than 50%, said process comprising ring opening polymerization of meso-lactide in the presence of a chiral metal alkoxide catalyst, where the same oxygen-acyl bond in a series of meso-lactide molecules is cleaved, whereby a polymer is formed containing a series of units containing stereocenters where adjacent stereocenters are of opposite stereochemistry.

3. The process according to claim 2, wherein the metal of the chiral metal alkoxide catalyst is not yttrium.

4. The process according to claim 2, wherein the chiral metal alkoxide catalyst is prepared by reacting a chiral ligand with Al(OR)$_3$ where R is straight chain or branched alkyl containing 1 to 20 carbon atoms in solvent, and then evaporating the solvent in vacuo.

5. The method of claim 4, wherein the chiral ligand is

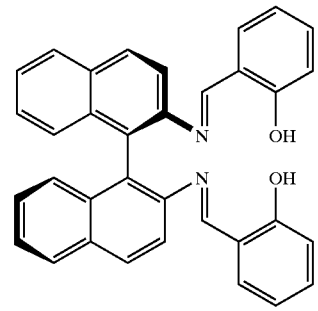

or the opposite enantiomer.

6. The method of claim 5, wherein R in Al(OR)$_3$ is isopropyl.

7. The method of claim 6, wherein R in Al(OR)$_3$ is methyl.

8. The syndiotactic poly(lactic acid) of claim 1 containing enantiotopic selectivity greater than 85%.

9. The syndiotactic poly(lactic acid) of claim 1 containing an enantiotopic selectivity of 96%.

* * * * *